(12) United States Patent
Feurer

(10) Patent No.: US 7,391,009 B2
(45) Date of Patent: Jun. 24, 2008

(54) ANGLE-MEASURING SYSTEM HAVING IRREGULAR REFERENCE MARK THAT IS DEDICATED WITHOUT TIME DELAY

(75) Inventor: Georg Feurer, Hirschberg (DE)

(73) Assignee: Carl Freudenberg KG (DE)

( * ) Notice: Subject to any disclaimer, the term of this patent is extended or adjusted under 35 U.S.C. 154(b) by 0 days.

(21) Appl. No.: 11/485,629

(22) Filed: Jul. 12, 2006

(65) Prior Publication Data

US 2007/0019183 A1    Jan. 25, 2007

(30) Foreign Application Priority Data

Jul. 14, 2005    (EP) .................................. 05015325

(51) Int. Cl.
*G01D 5/34*    (2006.01)

(52) U.S. Cl. .............................. 250/231.14; 250/231.13; 250/231.17; 341/15; 33/1 N; 33/1 PT

(58) Field of Classification Search ............ 250/231.13, 250/231.14, 231.17, 231.18; 356/616, 617; 341/6–8, 11, 13, 15; 33/1 PT, 1 N, 1 L, 1 MP
See application file for complete search history.

(56) References Cited

U.S. PATENT DOCUMENTS

| | | | | |
|---|---|---|---|---|
| 4,369,405 A | * | 1/1983 | Sato et al. ................... | 324/174 |
| 4,785,241 A | * | 11/1988 | Abiko et al. ........... | 324/207.21 |
| 5,043,660 A | * | 8/1991 | Hasegawa ............... | 324/207.12 |
| 5,430,373 A | * | 7/1995 | Ichikawa et al. ........ | 324/207.21 |
| 5,491,632 A | * | 2/1996 | Pawlak et al. ................... | 701/1 |
| 5,568,048 A | * | 10/1996 | Schroeder et al. ....... | 324/207.21 |
| 5,774,074 A | * | 6/1998 | Cooper et al. .................. | 341/11 |
| 5,965,825 A | * | 10/1999 | Nitecki ..................... | 73/861.77 |
| 6,410,910 B1 | * | 6/2002 | Feichtinger ............ | 250/231.13 |
| 6,847,309 B2 | * | 1/2005 | Andrieu ........................ | 341/15 |
| 6,854,455 B2 | * | 2/2005 | Lingener ..................... | 123/612 |
| 2004/0007663 A1 | * | 1/2004 | Steinlechner et al. .. | 250/231.16 |
| 2004/0012793 A1 | * | 1/2004 | Schubert ..................... | 356/616 |

* cited by examiner

*Primary Examiner*—Davienne Monbleau
(74) *Attorney, Agent, or Firm*—Harness, Dickey & Pierce, P.L.C.

(57) ABSTRACT

An angle-measuring system comprising at least one transmitter provided with a number of complementary signal-generating elements disposed in pairs and creating a pattern of signals. The elements create a reference mark irregularly configured at least at one spot. A device for acquiring the signals and an evaluation unit are also part of the angle-measuring system. The device is provided with at least one first sensor and one second sensor.

15 Claims, 3 Drawing Sheets

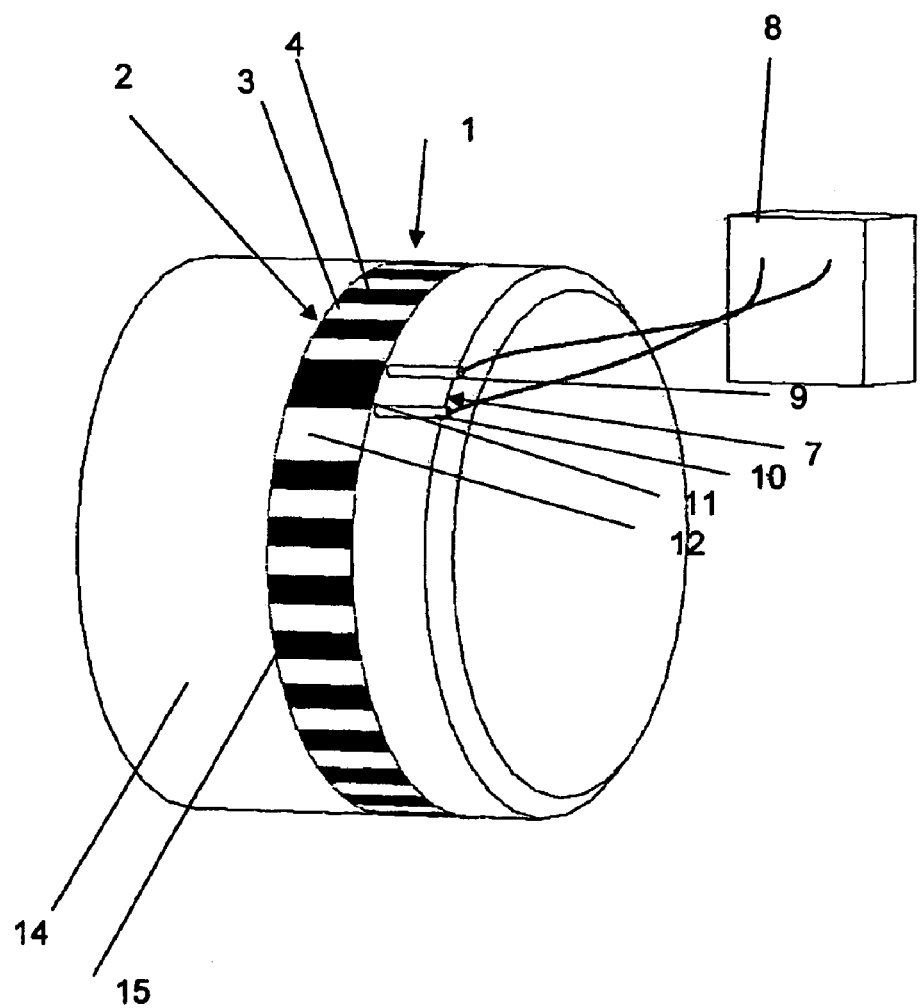
(Fig. 1)

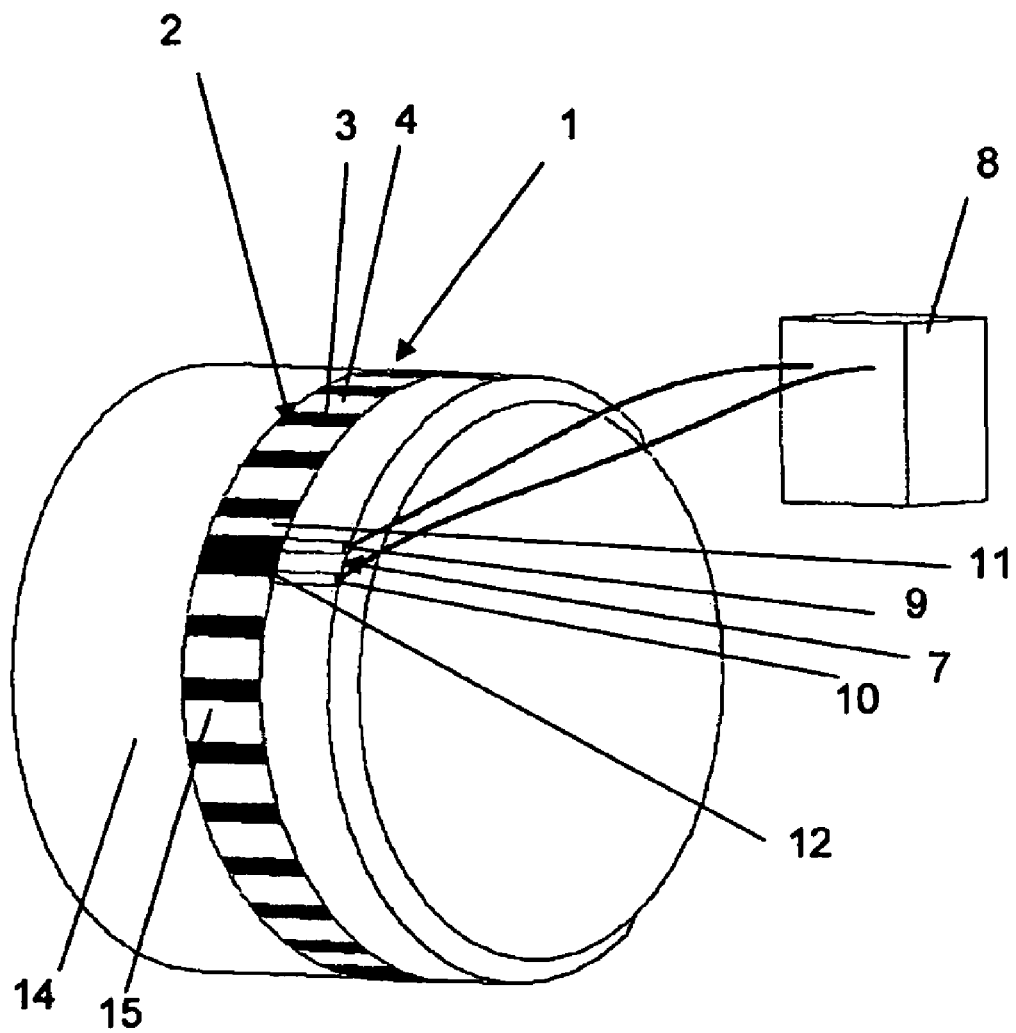
(Fig. 2)

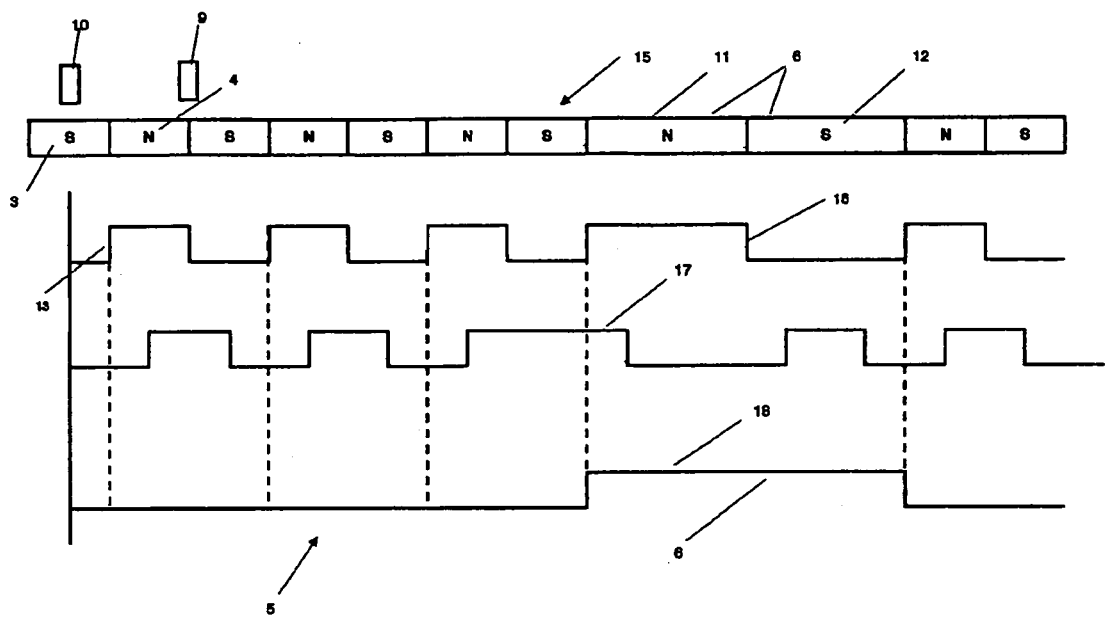
(Fig. 3)
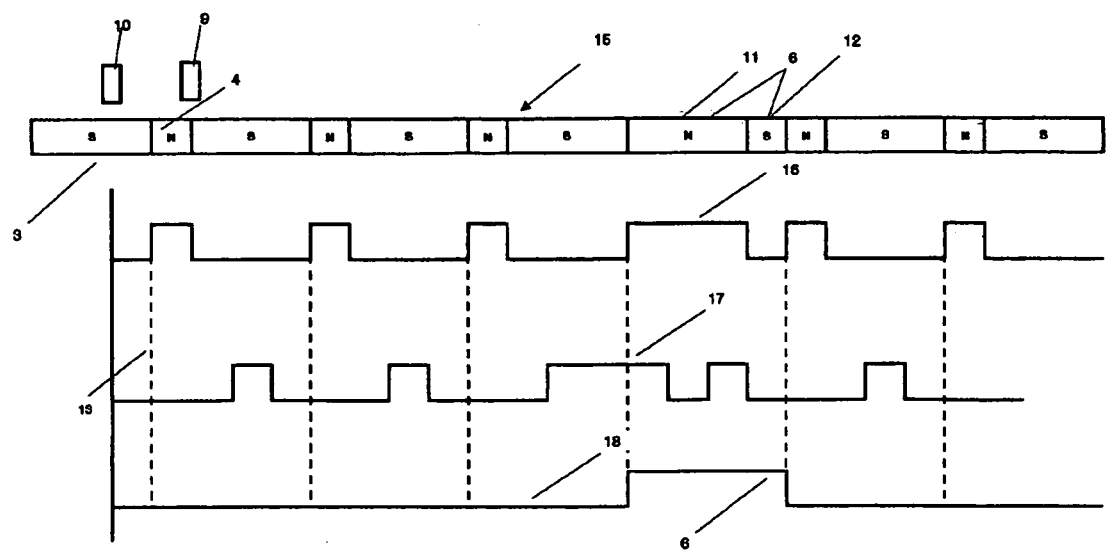
(Fig. 4)

ANGLE-MEASURING SYSTEM HAVING IRREGULAR REFERENCE MARK THAT IS DEDICATED WITHOUT TIME DELAY

CROSS-REFERENCE TO RELATED APPLICATIONS

This application claims the benefit of European Patent Application No 05015325.3, filed Jul. 14, 2005. The disclosure of the above application is incorporated herein by reference, in its entirety.

FIELD

The present teachings relate to an angle-measuring system comprising at least one transmitter provided with a number of complementary signal-generating elements. The elements are disposed in pairs and generate a pattern of signals. The elements form a reference mark that is irregularly configured at least at one spot. The present teachings also relate to a system for acquiring the signals, and an evaluation unit.

BACKGROUND

The statements in this section merely provide background information related to the present disclosure and may not constitute prior art.

Angle-measuring systems are generally known and are used, for example, for angle measurement on crankshafts of motor vehicles. In these cases, the signal-generating elements can be formed by a toothed wheel, or by a magnetized material. In the case of the toothed wheel, the signal pattern is generated by alternately disposed teeth and valleys. In the case of the magnetized material, the signal pattern arises from alternately disposed North and South poles. An irregular spot makes it possible to determine the angular position of a shaft by an angle-measuring system.

To determine the angle position, the signal pattern is acquired by a sensor and, in the evaluation unit, is converted into a binary signal. The time between signal changes is measured and, by comparing the measured times, it is possible to differentiate between regular and irregular elements. This configuration, however, has the drawback that the determination of the irregular pattern occurs in a delayed manner because for purposes of the time measurement the irregular pattern must first be completely scanned. The reliability of the detection of the various patterns depends on the rotational behavior of the shaft being surveyed. In the case of crankshafts, vibrations and acceleration processes cause rotation irregularities to take place. To ensure reliable detection of the various patterns, the regular and irregular pattern must be clearly differentiated.

SUMMARY

An object of the present teachings is to provide an angle-measuring system with low sensitivity to rotation irregularities, and to a system provides immediate differentiation of the patterns and requires only slight differences between regular and irregular patterns.

To reach the above objective, the system is provided with at least a first and a second sensor. The two sensors are preferably disposed at a distance from one another as seen in the circumferential direction. The sensors are disposed one after another, and are able to scan a single track that is provided with signal-generating elements. The angular position is determined by evaluating the signals coming from the sensors. A time measurement is not needed, and the detection of the irregular element takes place without a time delay. Because the rotation irregularities of the shaft being surveyed affect the two sensors to the same extent and at the same time, the reliability of the pattern detection is improved. This manifests itself positively, especially when the regular patterns are only slightly different from the irregular ones. In this case, in fact, a differentiation between the patterns in the event of an occurrence of rotation irregularities is not possible on the basis of a time measurement.

The distance of the sensors from one another can be between the length of a signal-generating element of the irregular element pair and the length of a signal-generating element of the regular element pair. If, for example, the length of the signal-generating element of the irregular element pair is greater than the length of the signal-generating element of the regular element pair, the signals received by the two sensors are equal only if an irregular element pair is positioned in front of the sensors so that the pair can be detected. The distance of the sensors from one another can also be between the length of the nonsignal-generating element of the irregular element pair and the length of the nonsignal-generating element of the regular element pair. A nonsignal-generating element is meant a signal that is assigned a digital value of zero.

In essence, the elements of the element pairs can have the same length and, compared to the regular element pairs, the length of an irregular element pair can be greater so that in an advantageous embodiment the irregular element pair is twice as long as the regular element pair. An angle-measuring system of the present teachings can then have 58 pairs of signal-generating elements with a total width of 6° distributed over the circumference, and one irregular element pair with a width of 12°. The elements of an element pair then have the same length and, because of the symmetrical poles, are readily fabricated as magnetized elements.

The elements of the element pairs can have different lengths, and for an irregular element pair the length ratio can be the opposite of that for the regular element pairs. All element pairs have the same length.

The length ratio of the elements for an element pair can be 45:55. In an angle determination with time measurement, the ratio of the element pairs must be substantially greater because the rotation irregularities lead to a temporal displacement of the signals as a result of which the recognition of the two different patterns is not possible. In this regard, in magnetic angle-measuring systems in particular, the pronounced asymmetry of the magnetic poles is problematic. In the angle determination with two sensors, time is not measured, and the influence of rotation irregularities is minor. For this reason, the ratio of the two elements can be selected to be much closer to the 50:50 ratio. In this case, magnetic angle-measuring systems, in particular, have the advantage of avoiding disturbing influences resulting from a pronounced asymmetry of the poles.

The transmitter can generate magnetic signals. It is necessary to differentiate between passive and active transmitters. With passive transmitters, the signal-generating elements are formed, for example, by a toothed wheel made of a magnetically conductive material. These transmitters are easily fabricated and inexpensive. Active transmitters are formed of magnetized signal-generating elements. The signals of the active elements are very readily detected by sensors. Magnetic signals are readily evaluated.

The transmitter can generate optical signals. Optical signals are not sensitive to disturbing electromagnetic effects of the adjacent devices. Optical signals can be generated, for example, with perforated disks.

The above objective is also reached by way of an angle-measurement method whereby the second sensor in the direction of rotation is monitored by the evaluation unit so that in the event of a signal change detected by the second sensor the signal of the first sensor is checked and com-pared with the signal of the second sensor. With the method of the invention, a time measurement for determining the length of the signal-generating elements can be omitted. The differentiation between regular and irregular elements occurs by comparison of the signals detected by the two sensors. In this case, the sensors are disposed at a distance such that different signals are received at the regular elements. For this reason, the distance is greater than the shortest signal-generating element and smaller than the largest signal-generating element. As the reference mark formed by an irregular element is passed, signals of the same kind are detected by the sensors. Under these conditions, the irregular element pair presents a different length ratio, for example a longer element pair or a reversal of the length ratio. By the direct comparison of the signals, the irregular element is detected without time delay. Because during the measurement both sensors are subjected to rotation irregularities of the surveyed shaft to the same extent, they do not exert any influence on the measuring result.

With the evaluation unit, the detection of the different elements is carried out in a very simple manner. With the unit, when a side with an increasing or decreasing flank arrives at one sensor, the level is acquired by the other sensor. If the sense of rotation is known, it is possible to determine from the level unequivocally whether a regular or irregular pattern is present before the sensors.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 shows an angle-measuring system according to the present teachings;

FIG. 2 shows another angle-measuring system according to the present teachings;

FIG. 3 shows a first signal pattern according to the present teachings; and

FIG. 4 shows a second signal pattern according to the present teachings.

DETAILED DESCRIPTION

The following description is merely exemplary in nature and is not intended to limit the present disclosure, application, or uses.

FIG. 1 shows an angle-measuring system 1 disposed on a shaft 14 of a motor vehicle. Angle-measuring system 1 comprises a transmitter 2 formed of 59 complementary signal-generating elements 3 and 4, which are disposed in pairs. The signal-generating elements 3 and 4 are disposed after one another on a single track 15 in the circumferential direction. In this embodiment, the signal-generating elements 3 and 4 are made of a thermoplastic material interspersed with magnetized ferrite. The signal-generating elements 3 and 4 are then formed as North and South poles.

Elements 3 and 4 generate a pattern of signals 5 (FIG. 3). In other embodiments, the signal-generating elements 3 and 4 can also consist of a perforated disk that generates optical signals. To create a reference mark 6, elements 3 and 4 are irregularly configured at one spot so as to form an irregular element pair 11 and 12. The angle-measuring system 1 also comprises a signal-detecting device 7 and an evaluation unit 8. Device 7 has two sensors 9 and 10 which, as shown in the circumferential direction, are disposed at a distance from one another and scan the track 15. Here the distance between sensors 9 and 10 from one another is greater than a width of the shortest signal-generating element 3, and shorter than a width of the signal-generating element 11. The element pairs 3 and 4 have the same length of about 6°. The 12°-length of the irregular element pair 11 and 12 is about twice as large compared to the regular element pairs 3 and 4 to form the reference mark 6 (FIG. 3).

FIG. 2 shows an angle-measuring system 1 of FIG. 1 in which the signal-generating elements of element pair 3 and 4 have a different length. The ratio of the elements of an element pair 3 and 4 in this embodiment is about 44:55. In a magnetic transmitter, this means that the North pole has a width of about 3.3° and the South pole has a width of about 2.7°. Thus, the length of an element pair in the case of 60 pairs is about 6°. For the irregular elements 11 and 12, the ratio is reversed. That is, the ratio is about 55:45.

To determine the angle of, for example, a crankshaft of an internal combustion engine, the second sensor 10 in the direction of rotation is monitored and, in the event of a signal change, for example a pole change, detected by the second sensor 10, the signal 5 of the first sensor 9 is acquired. If at the second sensor 10 there is a change from North pole to South pole and a North pole is at this instant positioned in front of the first sensor 9, the elements 3 and 4 are positioned in front of sensors 9 and 10. If at the second sensor 10 there is a change from a North pole to a South pole and at this instant a South pole is positioned in front of the first sensor 9, the elements 11 and 12 are positioned in front of the sensors 9 and 10. The evaluation unit converts the signals 5 of the sensors 9 and 10 into a binary signal.

FIG. 3 shows a pattern of signal 5 resulting from an angle-measuring system 1 of FIG. 1. Track 15 in this case has element pairs 3 and 4 of the same length of 6°. Compared to the regular element pairs 3 and 4, the length of the irregular element pair 11 and 12 of 12° is twice as large and forms the reference mark 6. In this case, the evaluation unit converts the signals detected by the second sensor 10 into a binary signal pattern 16. The signal pattern 16 is monitored for increasing flanks. When an increasing flank 13 arrives, the signal 18 is placed onto the level of signal 17. Signal 18 retains this value until another increasing flank 13 arrives and the level is then possibly changed. If signal 18 has a value of ONE, the reference mark 6 was recognized, and if signal 18 has the value of ZERO, a regular element is present in front of the sensors 9 and 10.

FIG. 4 shows a pattern of signal 5 resulting from the angle-measuring system of FIG. 2. In this embodiment the signal-generating elements of element pairs 3 and 4 on track 15 have a different length. The ratio of the elements of an element pair 3 and 4 in this embodiment is 44:55. For the irregular element 11 and 12, the ratio is reversed amounting to 55:45. In this case, the evaluation unit converts the signals detected by the second sensor 10 into a binary signal pattern 16. Signal pattern 16 is monitored for increasing flanks. When an increasing flank 13 arrives, signal 18 is placed on the level of signal 17. Signal 18 retains this value until another increasing flank 13 arrives and the level is then possibly changed. If signal 18 has the value of ONE, a reference mark 6 was recognized, and if signal 18 has the value of ZERO, a regular element is present in front of sensors 9 and 10.

What is claimed is:

1. An angle-measuring system comprising:
   at least one transmitter including a plurality of complementary signal-generating elements disposed in pairs that generate a pattern of signals, the elements forming a reference mark being irregularly configured at least at one spot;
   a device for acquiring the signals, and
   an evaluation unit for evaluating the signals,
   wherein the device has at least one first sensor and one second sensor, and said first and second sensors detect said reference mark when identical signals are detected by said first and second sensors such that detection of said reference mark occurs without a time delay.

2. The angle-measuring system as defined in claim 1, wherein the sensors, seen in the circumferential direction, are disposed at a distance from one another.

3. The angle-measuring system as defined in claim 1, wherein a distance of the sensors from one another is greater than a length of a shortest of the signal-generating elements and shorter than a length of a longest of the signal-generating elements.

4. The angle-measuring system as defined in claim 1, wherein the transmitter also includes nonsignal-generating elements, a distance of the sensors from one another being greater than a length of a shortest nonsignal-generating element and shorter than a length of a longest nonsignal-generating element.

5. The angle-measuring system as defined in claim 1, wherein the signal-generating element pairs have essentially a same length, and the length of the signal-generating elements pairs being less than a pair of irregularly formed signal-generating elements that form the reference mark.

6. The angle-measuring system as defined in claim 5, wherein the length of the pair of irregularly formed signal-generating elements that form the reference mark is twice as long as the signal-generating element pairs that do not form the reference mark.

7. The angle-measuring system as defined in claim 1, wherein the elements of the element pairs have different lengths, and a length ratio for an irregular element pair that form the reference mark is inverted.

8. The angle-measuring system as defined in claim 7, wherein a length ratio of the elements for an element pair is 45:55.

9. The angle-measuring system as defined in claim 1, wherein the transmitter generates electromagnetic signals.

10. The angle-measuring system as defined in claim 1, wherein the transmitter generates optical signals.

11. The system of claim 1, wherein said identical signals consist of magnetic signals of the same polarity.

12. An angle-measurement device comprising:
    a transmitter including a plurality of pairs of regular signal-generating elements and at least one pair of irregular signal-generating elements that form a reference mark;
    a first sensor and a second sensor disposed adjacent the transmitter; and
    an evaluation unit coupled to the first and second sensor,
    wherein said first and second sensors detect said reference mark when identical signals are detected by said first and second sensors such that detection of said reference mark occurs without a time delay.

13. The angle-measurement device according to claim 12, wherein a distance between the first sensor and the second sensor is greater than a length of the regular signal-generating elements, and shorter than a length of the irregular signal-generating elements.

14. The angle-measurement device according to claim 12, wherein a length of the irregular elements is twice as long as a length of the regular element pairs.

15. The system of claim 12, wherein said identical signals consist of magnetic signals of the same polarity.

* * * * *